United States Patent
Shaffer et al.

[11] Patent Number: 6,003,089
[45] Date of Patent: Dec. 14, 1999

[54] METHOD FOR CONSTRUCTING ADAPTIVE PACKET LENGTHS IN A CONGESTED NETWORK

[75] Inventors: Shmuel Shaffer; David Weiss, both of Palo Alto; Jay Casuba, Mountain View, all of Calif.

[73] Assignee: Siemens Information and Communication Networks, Inc., Boca Raton, Fla.

[21] Appl. No.: 08/828,483

[22] Filed: Mar. 31, 1997

[51] Int. Cl.[6] ............................ G06F 15/00; G06F 13/00; G06F 13/14
[52] U.S. Cl. ..................... 709/233; 709/231; 709/232; 709/234; 709/250; 395/730; 395/826; 395/559; 370/232; 370/248; 370/397; 370/402
[58] Field of Search ................ 340/825.05; 709/232, 709/250, 233, 234, 231; 370/232, 248, 397, 402, 395, 392, 469, 399, 471; 395/730, 826, 559

[56] References Cited

U.S. PATENT DOCUMENTS

| | | | |
|---|---|---|---|
| 4,704,606 | 11/1987 | Hasley | 340/825.5 |
| 4,771,391 | 9/1988 | Blasbalg | 364/514 |
| 5,570,362 | 10/1996 | Nishimura | 370/60.1 |
| 5,680,401 | 10/1997 | Gayton et al. | 370/474 |
| 5,802,287 | 9/1998 | Rostoker et al. | 395/200.8 |
| 5,870,394 | 2/1999 | Oprea et al. | 370/392 |

*Primary Examiner*—Frank J. Asta
*Assistant Examiner*—Beatriz Prieto
*Attorney, Agent, or Firm*—Heather S. Vance

[57] ABSTRACT

In a network, the efficiency of data transfer is improved. The network includes packets of data (100, 120). The invention begins by preserving an original packet (100). A larger packet (140) is then constructed by combining two packets (100, 120). Either the original packet (100) or the larger packet (140) is transmitted over the network. The original packet (100) is transmitted if the media/port (52) becomes available for transmission before the larger packet (140) is constructed, and the larger packet (140) is transmitted if the constructing of the larger packet (140) is completed before the media (52) becomes available. In a network with cells, a packet is constructed by combining cells. This packet is built until the media becomes available for transmission. The size and composition of this packet is independent of an original packet's size and composition.

25 Claims, 8 Drawing Sheets

AN ETHERNET SWITCH

LAN TO ATM

METHOD FOR CONSTRUCTING ADAPTIVE PACKET LENGTHS IN A CONGESTED NETWORK

BACKGROUND OF THE INVENTION

1. Field of the Invention

The invention relates to networks, and more particularly to a system and a method for increasing the efficiency of data transfer through a network.

2. Description of the Related Art

Networks are used to link a group of end user equipment together. This end user equipment usually includes computers and computer peripherals (e.g., printers). An example is Ethernet, which provides communication at rates up to 10 Mbits/second among linked machines, via a single cable. A local area network (LAN) allows users at different computers to access each others files. LANs can also be used to pool resources. For example, a fast large disk, high-priced plotters or printers, etc. can be shared by multiple users when a LAN is employed. A node refers to any device or combination of devices on the LAN. LANs allow for the attachment of many nodes to a common physical link. The shared access link permits any node to communicate directly with any other node which is attached to the link. Data is transferred through a network inside packets. Each packet consists of a variable-length information field (containing data) preceded by appropriate addressing fields (e.g., a header). The header usually includes a destination for the data in the packet. A wide area network (WAN) has a similar structure to the LAN and includes similar packets.

The average size of a packet is an important factor which affects the efficiency of a network. Usually, shorter packet sizes result in less efficient networks. In an Ethernet network, the packet size may vary from 46 Bytes to 1.5 K Bytes. The default packet size for an asynchronous transmission mode (ATM) network is 53 Bytes. Also, packets are referred to as cells in an ATM network. Thus, an ATM network has fixed cells of 53 bytes each. Typically, for most networks, the transmission of key strokes results in a large number of short packets while the transfer of a large data file results in long packets.

The Ethernet network was originally designed to work under a low load. A low load occurs when a small amount of data is transferred through the network. Similarly, a heavy or high load occurs when a large amount of data is transferred through a network. As long as the Ethernet network utilization is below 10%, the network provides good connectivity to its users. However, when the utilization of the network increases, the network performance degrades. For example, the time that nodes have to spend waiting for the network to become available increases. As packets travel through a network, they are transferred between nodes. A transmitting node will only transmit a packet when the section immediately after the transmitting node (on the way to the destination node) is available.

If a heavy load is present on the network, the transmitting node may have to wait an extensive period of time before the path becomes available. Furthermore, a heavy load on the network increases the delay due to collision and back off. Multiple packets/data can be transmitted at the same time. Normally, collision occurs when two or more nodes transmit packets at the same time onto the same media. To remedy this situation, a back off is used. Back off takes place after the transmitter on a node, which just sent a packet, detects a collision. The transmitter then (1) stops transmitting (2) waits a random period of time, (3) checks if the media is available and (4) retransmits the packet. The random period of time is within a specific range of time set forth in the Internet Standard. This range of time takes into consideration both the need for efficiency (short period of time) and the need for a reduced chance of another collision (longer period of time).

Overall, with an increased load on the network, nodes that wish to transmit a packet through the network often find that the media is not available for them and that they must wait before transmission can occur. This wait period increases as the load of the network increases and contributes to the overall latency of the network. Thus, long latency is commonplace whenever the average length of packets is short and the load on a given network segment is high. Long latency results in sub-optimal performance because the latency degrades the quality of service provided to the network users.

Ether-Switches can be used to reduce the load on segments in the network which have too high a load. Ether-Switches replace a shared media (i.e., Ethernet segment) with a star connection. Fewer collisions occur because a switch rather than a segment connects the various nodes. Adding Ether-Switches to reduce the load on a network is expensive, and it does not solve the basic problem of short packets. These short packets might still degrade the efficiency of network segments which are not provided with an Ether-Switch.

Network partitioning can improve network bandwidth when network performance is compromised by extreme overloading and collision saturation. Network partitioning involves breaking large networks into a series of smaller ones using subnetworks and high speed switches to connect them. Virtual switching is an example of network partitioning where individual paired nodes are configured on-the-fly into virtual sublets for the duration of that transmission. The disadvantage of network partitioning is that it increases the latency of inter-network transmissions because of the service time delays at the intermediate nodes.

"Cut through" devices can also be used to reduce latency in a network. A "cut through" device is used as a switch in a network. The "cut through" device waits for part of a packet and starts transmitting that packet. Conventional switches (referred to as store and forward devices) wait for the whole packet to arrive and then transmit the packet. Unfortunately, "cut through" devices only reduce the latency under a low network load. The "cut through" method does not perform well under moderate and heavy loads. For example, an error may be found at the end of a packet. If this occurs, the "cut through" device has already started to transmit the packet, so the packet must be retransmitted. Thus, in this example, the media is used unnecessarily and time is wasted while the media is occupied twice by the transmission of the same packet.

Adaptive packet length traffic control can be used to attempt to reduce the effects of a heavy load on a LAN. U.S. Pat. No. 4,771,391 provides a description of adaptive packet length traffic control. Basically, the size of the packets transmitted by each node is controlled. The data flow in the network is monitored and an average packet length is computed. The size of the data field in each packet is then adjusted based on the computed average packet length. Each packet is adjusted to the average packet length. Unfortunately, the media/port for data transfer may become available while the packet length is being adjusted. Transfer does not occur until the packet length has been adjusted. While the adaptive packet length traffic control reduces latency in an overloaded LAN, it does not provide optimal service when the LAN is moving between heavy and low loads nor when the LAN is experiencing a low load. Moreover, complex monitoring and computation is required.

A router can be used to alter packet size (i.e., reduce or increase the packet size). These altered packets can be used to bridge, for example, a 9 K Byte or 64 K Byte to an Ethernet. For example, to route between ATM and LANs, the built-in packet fragmentation capability of the router (referred to as segmentation and reassembling, or a SAR, in this example) can be used to break the LAN-sized packets into ATM cells/packets as they cross the LAN to ATM boundary. If the ATM cells are then routed back via a SAR to a LAN, each original packet is completely reassembled before being sent out over the media. Thus, even if the media is available for transmission of the data, the packet will not be transmitted until it is completely reassembled. While this method of altering the packet size allows for connection between ATM and LANs, it does not address the problem of network degradation and utilization of the available media.

As stated above, network degradation can occur under moderate and heavy loads as a result of short packets. It is desirable to have a network which (1) optimizes the length of the packets, (2) reduces the packets' latency by utilizing an available media and (3) reduces the amount of memory required for the network devices. Hence, it is desirable to improve the efficiency of the data transfer through the network.

SUMMARY OF THE INVENTION

According to the invention, a method and an apparatus for increasing the efficiency of data transfer through a network is provided. The network includes packets of data. The invention detects congestion of the packets in the network, and preserves an original packet. A larger packet is then constructed by combining two or more packets. Either the original packet or the larger packet is transmitted over the network. The original packet is transmitted if the media becomes available for transmission before the larger packet is constructed, and the larger packet is transmitted if the constructing of the larger packet is completed before the media becomes available.

In another embodiment of the present invention, cells of data are received. These cells of data are then collected and stored. A packet is constructed by combining the received cells. This constructing occurs until the media is available for transmission. The size and composition of the constructed packet is independent of an original packet size and composition. The constructed packets are transmitted when the media becomes available for transmission.

DETAILED DESCRIPTION

The present invention provides for adaptive processing of data packets in a network when the media is not available for data transfer. In an Ethernet network, this adaptive processing takes advantage of the waiting period caused by (1) carrier detection or (2) collision detection with the associated back off time. Carrier detection checks for a packet on the media, and collision detection checks for a collision on the media. Back off time, as stated above, is the amount of time the transmitting node must wait before it can retransmit a packet. In a token ring network, the present invention takes advantage of the waiting period caused when the token is not available for a particular node. In both Ethernet and token ring networks, the network degradation caused by short packets is avoided by combining multiple short packets into a larger packet. In addition to optimizing the length of the packets, the network (1) reduces the packets' latency by utilizing the available media and (2) reduces the amount of memory required for the network devices.

Figure 1:
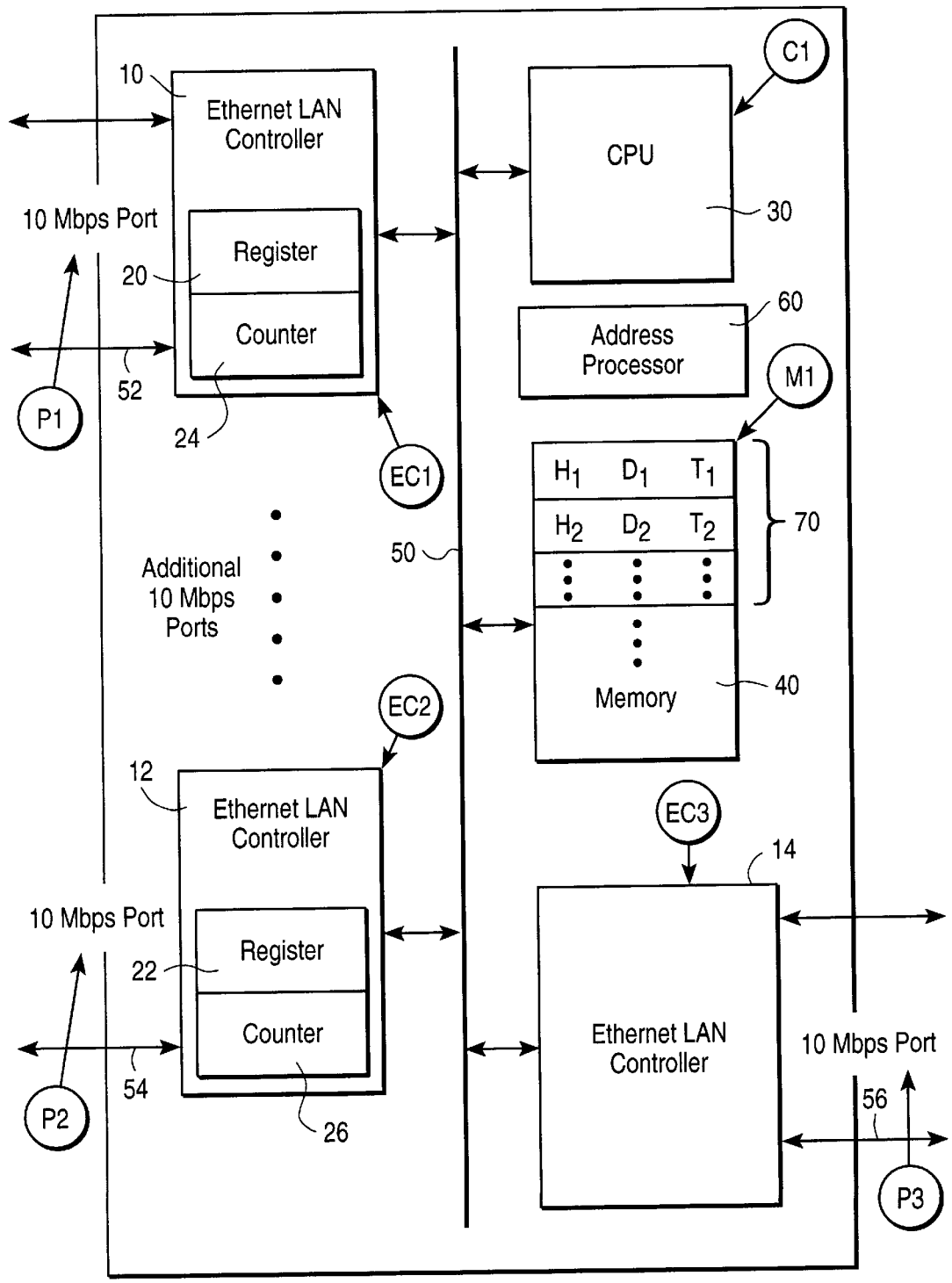
FIG. 1 illustrates an Ethernet switch.

FIG. 1 illustrates an Ethernet switch. This Ethernet switch contains Ethernet LAN controllers 10, 12, 14. Ethernet LAN controllers 10, 12, 14 include registers 20, 22 and counters 24, 26. A central processing unit (CPU) and a memory 40 are also located in the Ethernet switch. A bus 50 is used for communication between the Ethernet LAN controllers 10, 12, 14, CPU 30 and memory 40. Ports 52, 54, 56 are input/output ports (I/O ports). In this example, the packets arrive at port 56 and are destined for either port 52 or port 54. The data stream is collected in memory 40 until a complete packet is accumulated. The packet is then validated and transferred to the Ethernet LAN controller 10 for transmission via, for example, port 52 of the network. During this operation, additional packets with the same destination may arrive from port 56. As long as the media of port 52 is available, the packet is quickly transmitted via port 52 through the network to the destination.

Under moderate or heavy loads, the network may become increasingly unavailable to port 52. The port with a packet ready for transmission may detect a carrier on the media. When this occurs, the port must wait before it can transmit its packet into the network. On another attempt, the port may transmit a packet into the network and detect a collision. In accordance with the "truncated binary exponential back off" algorithm, the node must back off from the media for a time period ranging from 0 to 52.4 msec. More information on the "truncated binary exponential back off" can be found in the Internet Specification. The attempt to transmit a single packet may cause numerous collisions resulting in multiple back off delays. Thus, the media can be unavailable for an extensive period of time. While port 52 is waiting for the media to become available, packets from port 56 will continue to arrive. To accommodate this continuous incoming stream of data (i.e., backlog of data), a large memory is required/provided.

Figure 2:
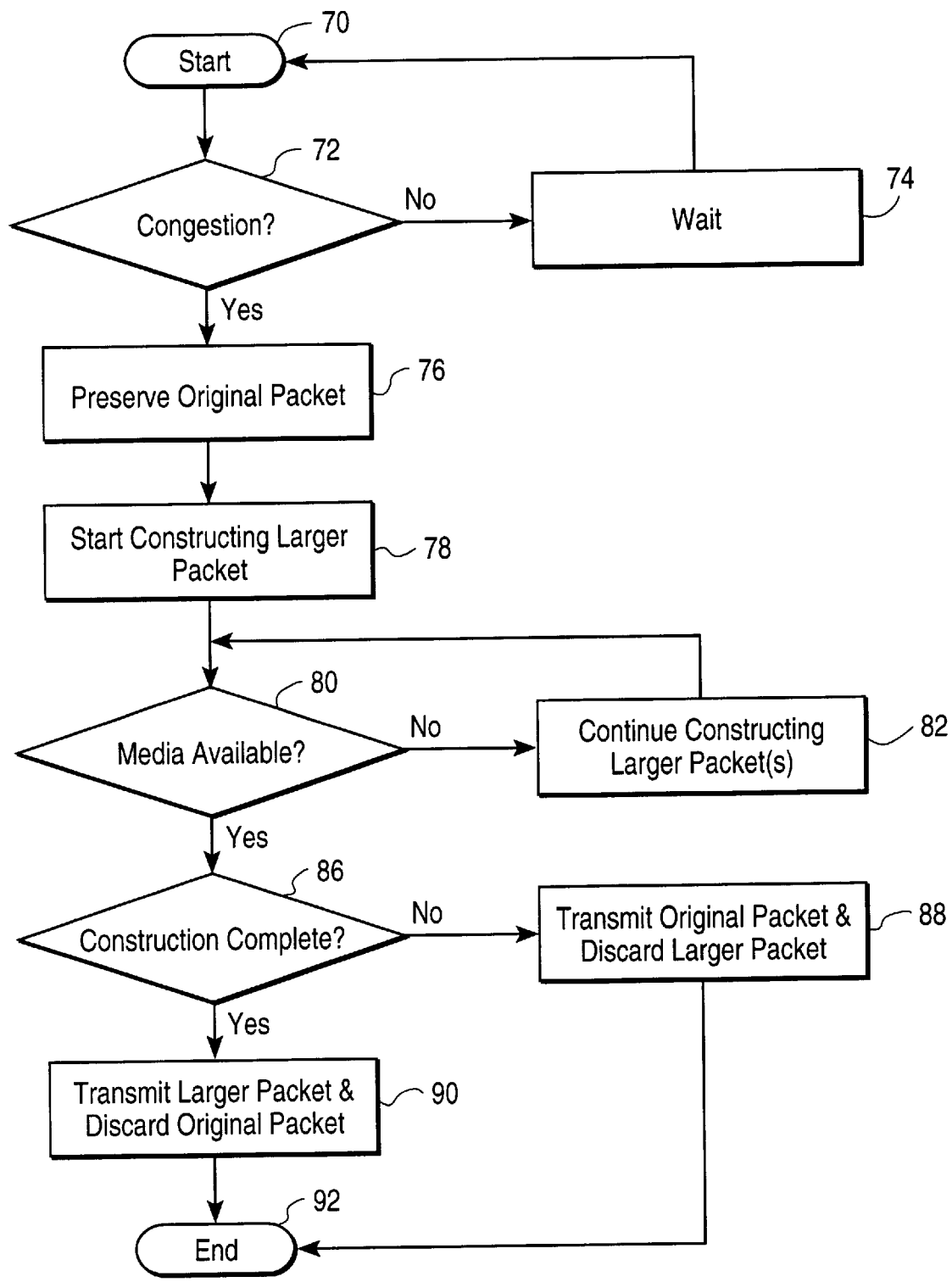
FIG. 2 is a process flowchart for an embodiment of the present invention.

FIG. 2 is a process flowchart for an embodiment of the present invention. At step 70, the process starts. At step 72, the present system checks for a congestion condition on the network. A congestion condition occurs when more than a single packet is located in the memory. If a congestion condition is not present, the system waits at step 74 and then continues to check for congestion at step 72. If a congestion condition is present, the original packet is preserved at step 76. At step 78, the system starts constructing a larger packet.

The larger packet is constructed by combining the data from two or more packets. Building/constructing of the larger packet can be done by a CPU located in a switch. At step 80, the system checks if the media is available for transmission. This checking can be done, for example, by a controller in the Ethernet switch. If the media is available, the construction of the larger packet continues at step 82.

When the construction of the larger packet is complete, the system starts constructing another larger packet. This constructing of larger packets continues until the media is available for packet transmission. When the media is available, the system moves to step 86. At step 86, the system checks if construction of the larger packet is complete. If construction of the larger packet is not complete, the original packet is transferred and, after a specific waiting period, the partially constructed larger packet is discarded at step 88. The specific waiting period ensures that the original packet has been transmitted successfully (i.e., a collision has not occurred). The process then ends at step 92.

Returning to step 86, if the construction of the larger packet is complete, the larger packet is transmitted and the original packet is discarded. At step 90, the first packet is dequeued from the Ethernet LAN controller 10 (see FIG. 1) and discarded, and the new, larger packet is transferred to the LAN controller for transmission to the network. Thus, the present system can dequeue a packet from an Ethernet transmitting module after that packet has been passed along for transmission. If one or more larger packets are completely constructed, the system only sends the first constructed larger packet and stores the other larger packet(s) for later transmission (i.e., when the media is available again). In the preferred embodiment, if one or more larger packets are complete, but another even larger packet is still being constructed, the incomplete even larger packet (which includes the larger packet) is discarded after the larger packet is sent, when the original packet is discarded at step 90. The process then ends at step 92. This process of packet recombination continues as long as the media of port 52 (see FIG. 1) is busy and the length of the packet to be transmitted is smaller than the maximum allowable length of the network. Thus, packets are effectively recombined during the time that the physical layer is not available.

Packets are processed in parallel such that the larger packet is being built even after the original packet is transmitted. The building process continues for a specific period of time. This time period allows for the return of an unsuccessful transmission of the original packet. Therefore, if the original packet is not returned within the specific period of time, the system correctly assumes the original packet was successfully transmitted, stops building the larger packet and discards the larger packet. This is done because computation for a prospective optimization is time critical. If the optimization/calculation (i.e., building of the larger packet) can be completed within a time window, it is used. Otherwise, the computation (i.e., the larger packet) is abandoned and a new attempt to optimize is started. If the transmission of the original packet is unsuccessful and construction of the larger packet was completed during the unsuccessful transmission, the larger packet is transferred over the media and the original packet is discarded.

The resulting size of the transmitted packet depends on the load of the network. The higher the load on the network, the longer the delay before the media becomes available. This delays results in more time for processing and creating longer packets. For example, after a larger packet is constructed, the media may still be unavailable to port 52. In this situation, the original packet is replaced by the newly constructed, larger packet. The system then begins construction of an even larger packet. In the preferred embodiment, this even larger packet will include the constructed larger packet along with another packet. This continues until the larger packet reaches its maximum allowed size. In the preferred embodiment, when the maximum allowed size is reached, construction begins on another larger packet.

Before two packets are combined into a larger packet, the CPU performs several compatibility checks. For example, the CPU can check for the following attributes: (1) the two packets must be addressed to the same destination, (2) the sequence numbers of the packets must be sequential, (3) the resulting length of the new packet must be smaller than the maximum allowed size on the network and (4) the priority (e.g., urgent vs. regular priority) of the two packets must be the same. Referring again to FIG. 1, address processor 60 reads the address of a newly arrived packet and then searches for a match from the saved addresses 70. When a matching address is found, the other required attributes are checked. When two packets with matching attributes are found, the building of a larger packet begins. To facilitate this operation, the system includes layer three (3) protocol processing capabilities. Layer three (3) protocol processing capabilities include routing and addressing. Establishing, maintaining and terminating connections as well as flow control may or may not be part of this network layer protocol.

Figure 3:
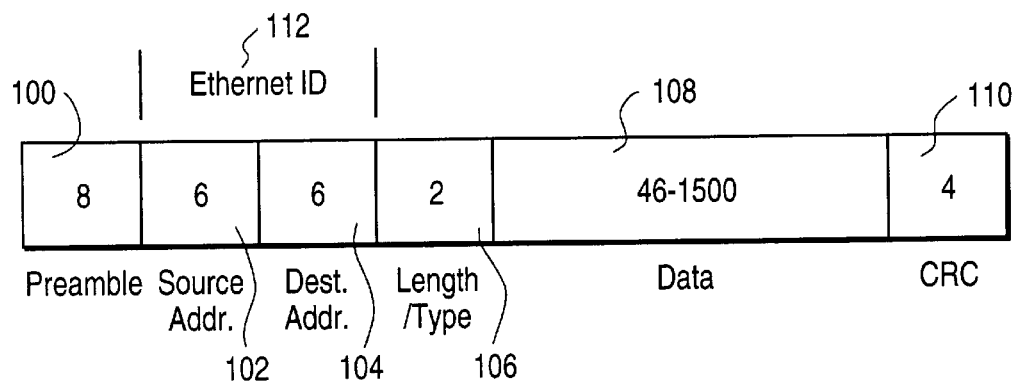
FIG. 3 illustrates the Ethernet packet format.

FIG. 3 illustrates the Ethernet packet format. The preamble 100, source address 102, destination address 104 and packet length/type 106 make up the Ethernet packet header. Data 108 is between 46 and 1500 bytes. Cyclical redundancy check 110 is a sophisticated version of a checksum which detects errors. Ethernet identification 112 includes source address 102 and destination address 104. Ethernet identification 112 must be the same for two packets before those packets can be combined.

Figure 4:
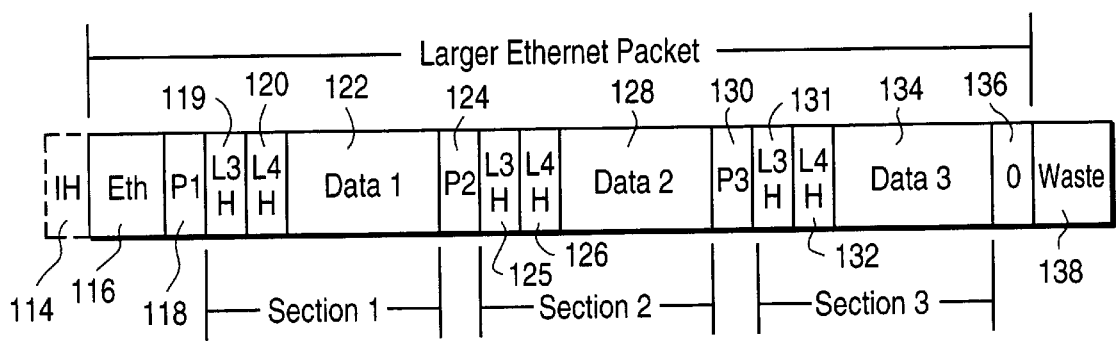
FIG. 4 illustrates an example of an Ethernet packet produced by the present invention.

FIG. 4 illustrates an example of an Ethernet packet produced by the present invention. In the preferred embodiment of the invention, Internal header 114 is a special header for internal use. Internal header 114 locks during the combination of packets and unlocks when the recombination is complete. Packet transfer can only occur when internal header 114 is unlocked. Therefore, internal header 114 is used to eliminate the transfer of incomplete packets.

Ethernet header 116 includes the preamble, source address, destination address and packet length/type information of the potentially enlarged packet. The length information includes the overall length of the larger packet. First pointer 118 is another special header used for this embodiment of the present invention. In the preferred embodiment, first pointer 118 is one or two bytes, and it provides the length of its corresponding packet section along with a location for where the next packet section begins. First pointer 118 provides the total length of the data which may include higher lever layer headers, such as layer three header 119 and layer four header 120, along with data 122. First pointer 118 also points to the beginning of second pointer 124.

Layer three header 119 contains data used in higher layers than the current layer, such as layer three of the OSI model. Similarly, layer four header 120 contains data used in, for example, layer four of the OSI model. Data 122 contains data from the first packet which is combined into the larger Ethernet packet.

Second pointer 124 provides the total length of layer three header 125, layer four header 126 and data 128. Second pointer 124 also points to third pointer 130. Third pointer 130 provides the total length of layer three header 131, layer four header 132 and data 134. Thus, in this example, each section of data in the larger packet is a complete Ethernet packet without its original Ethernet header. Third pointer 130 also points to zero 136. When a pointer points to a location with a zero, this indicates the end of the larger packet.

Only complete packets are placed in the larger packet. In addition, the packet order is always maintained. Therefore, if the next packet eligible for combining will result in a larger packet which exceeds the maximum size allowed for packets, waste area 138 is left at the end of the larger packet, and the next eligible packet is built into the next larger packet. Waste area 138 could be large when large packets intermingle with small packets (e.g., up to approximately 1.5 k bytes). Waste area 138 is not sent in the larger packet, but it represents how much more data could be included in the larger Ethernet packet. For simplicity, received packets are not divided between larger packets. If the packets were divided, information related to upper layers (e.g., a layer three header) and regular data would have to be identified separately at a lower layer (e.g., layer two). By keeping the received packets whole, the present arrangement provides for faster processing with less errors. In the preferred embodiment, building of a larger Ethernet packet continues while the media is unavailable as long as the newly created larger packet is smaller than the network's maximum allowable packet length.

In the preferred embodiment, the data from the second (or more) packet(s) is transmitted with the data from the first packet. This eliminates the need for the second (or more) packet(s) to negotiate separately for access to the media. This greatly reduces the latency for the transfer of the packets. In addition, the recombination of packets reduces the total number of packets and bytes of data that travel through the network. This decreases, among other things, the number of collisions on the network. As a result the efficiency of the network is improved.

The present invention can be applied to any device which uses the Carrier Shared Media Access/Collision Domain (CSMA/CD) access method with the physical layer of a network. Moreover, the present invention can be applied to any network where packets have to wait for the media to become available. For example, a token ring device may utilize the method of the present invention to improve the efficiency of the network while the device is waiting for the token to access the media. The present invention can also be applied to WANs, MANs (metropolitan area networks), GANs (global area networks), and the like.

Figure 5:
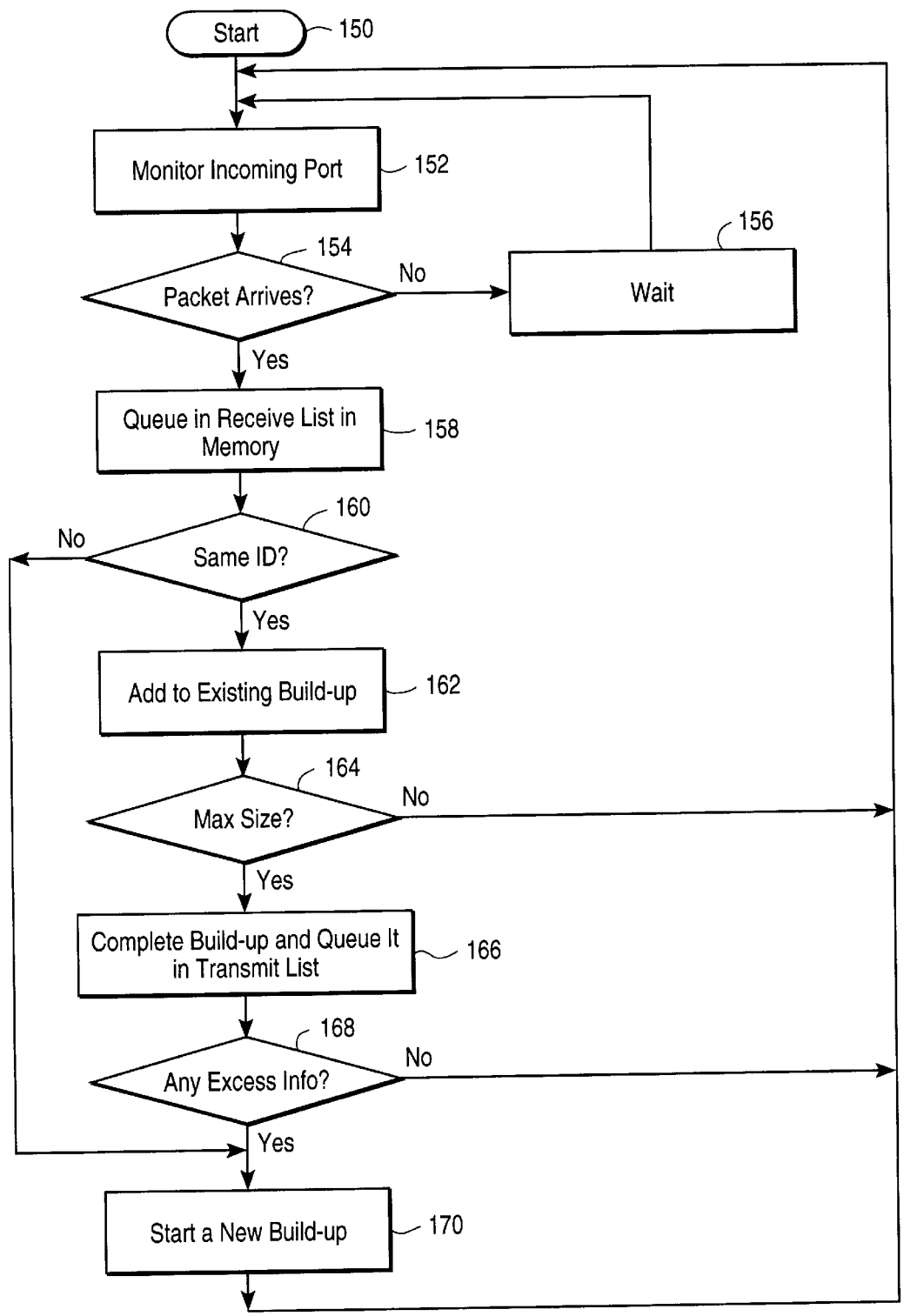
FIG. 5 is an example of a process flowchart for packet construction.

FIG. 5 is an example of a process flowchart for packet construction. In the preferred embodiment, three independent types of engines are used: a receive engine, a compute engine and a transmit engine. FIG. 5 includes steps related to the receive engine (steps 150–158) and to the compute engine (steps 160–170). The process begins at step 150. At step 152, an incoming port is monitored. At step 154, the system checks if a packet has arrived at the incoming port. If a packet has not arrived, the system waits at step 156 and then monitors the incoming port again at step 152. If a packet has arrived, the packet is queued in a receive list in the system's memory at step 158. Each receive list in the memory corresponds with a different Ethernet identification. At step 160, the computer engine checks the receive lists in the memory for packets with Ethernet identifications that already exist in packets which are in a build-up stage. Pointers are used to find a desired Ethernet identification. If no packets with the same Ethernet identification are found, the compute engine moves to step 170. If a packet with the same Ethernet identification is found, the received packet is added to the existing build-up for the packet with the same Ethernet identification at step 162.

At step 164, the system checks if the larger packet being built has reached the maximum size. The maximum size here is the maximum size allowed by the network minus the minimum packet size. This maximum size is used because another packet could not be added after this size is reached. If the maximum size is not reached, the system returns to step 150. If the maximum size is reached, the system moves to step 166. At step 166, the packet build-up is completed, and the newly created larger packet is stored in its memory list and queued for transmission. When a packet is queued for transmission, no further processing is necessary. At step 168, the system checks for any excess information which results from building a larger packet which is too large. If no excess information exists, the system returns to step 150. If excess information is present, the systems uses that excess information to start building a new larger packet at step 170. The excess information in this example is a received packet which cannot fit into the larger packet. This received packet is then used as the first packet in the next larger packet. After each packet is added to a larger packet, the compute engine leaves that larger packet in a complete state such that the transmit engine can take it for transmission. The complete state is indicated by an unlock in the internal header of the packet. When a packet is being constructed/built, the packet is locked and cannot be taken for transmission. Thus, transmission can only occur when the packet is in an unlocked state. This ensures synchronization between the compute engine and the transmit engine.

Figure 6:
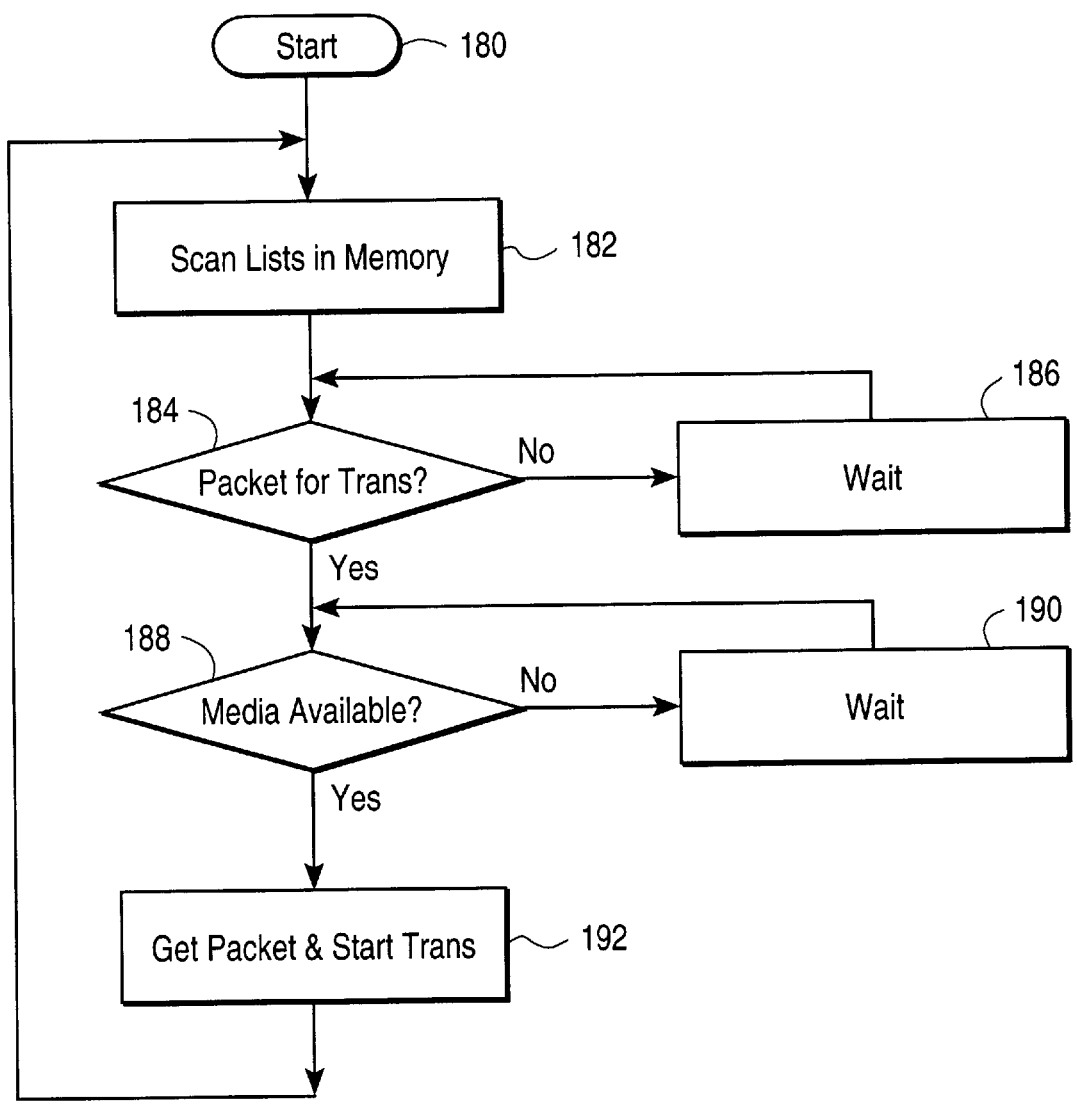
FIG. 6 is a process flowchart for a transmit engine for packet transmission.

FIG. 6 is a process flowchart for a transmit engine for packet transmission. At step 180, the process begins. At step 182, the system scans the transmission lists in memory. At step 184, the system determines if a packet is available for transmission. If a packet is not available for transmission, the system waits at step 186. If a packet is available for transmission, the system checks if the media is available at step 188. If the media is not available, the system waits at step 190. If the media is available for transmission, the system moves to step 192. At step 192, the system picks the largest packet available from the various lists in memory, and starts transmitting that packet. The system then returns to step 182.

Figure 7:
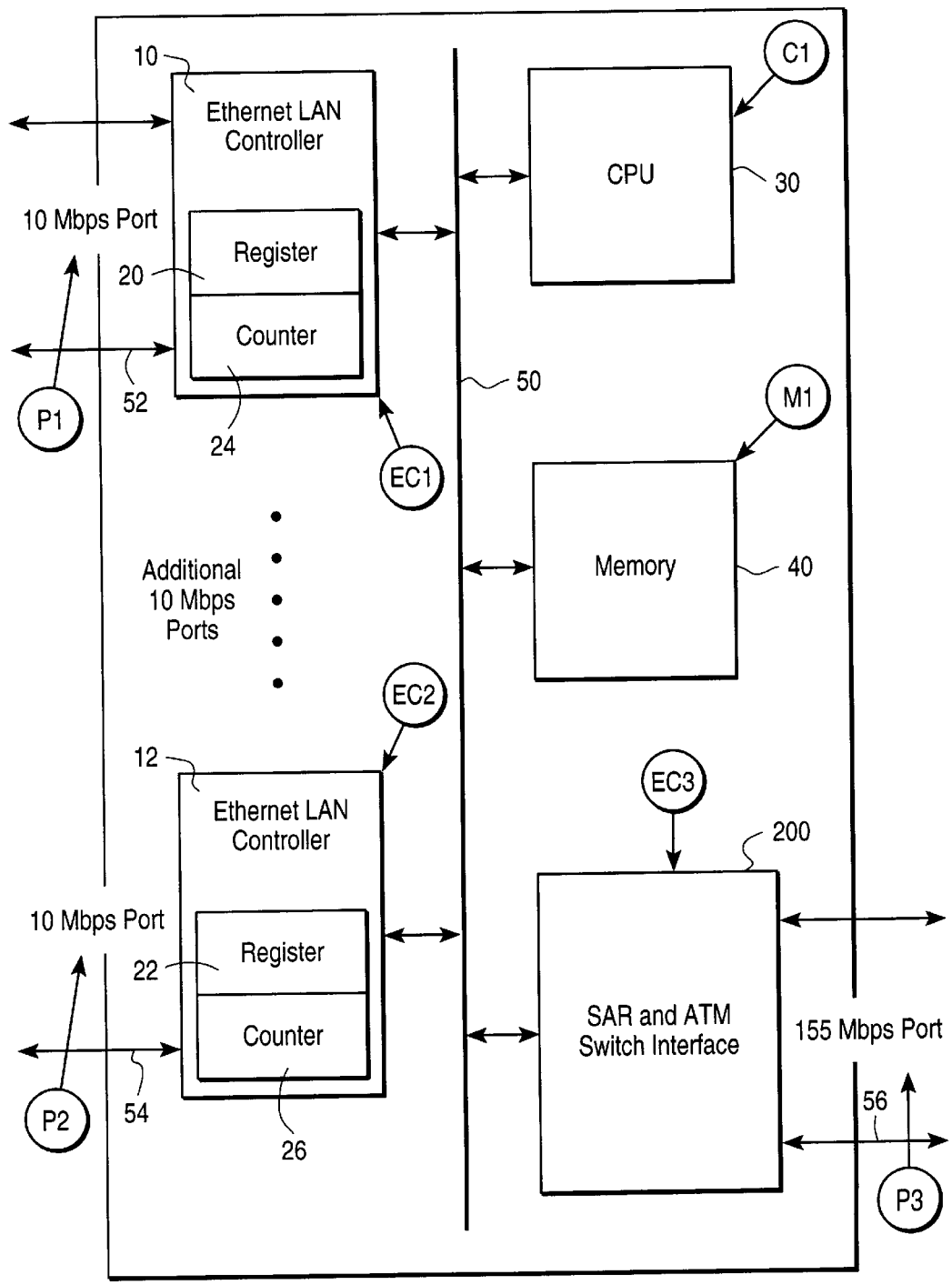
FIG. 7 illustrates an ATM switch with a LAN emulation port.

FIG. 7 illustrates an ATM switch with a LAN emulation port. FIG. 7 is similar to FIG. 1, except Ethernet LAN controller 14 (see FIG. 1) is replaced with SAR and ATM switch interface 200 in FIG. 7. The present invention can be applied to networks such as ATMs where packets are reassembled from cells. SARs can be used to break LAN-sized packets into ATM cells/packets as they cross the LAN to ATM boundary. The ATM cells can then be routed back to a LAN via a SAR. As stated above, when the ATM cells are routed back to a LAN, the prior art requires that the entire LAN packet be reassembled before the packet can be transmitted. With the present invention, a fragmentation of the packet can be transmitted when the media becomes available. Therefore, fractional packets are built out of a portion of the total amount of cells which made up the original packet. For example, an original packet with a length of 1 K Bytes can be assembled from the cells arriving through ATM port 56.

Figure 8:
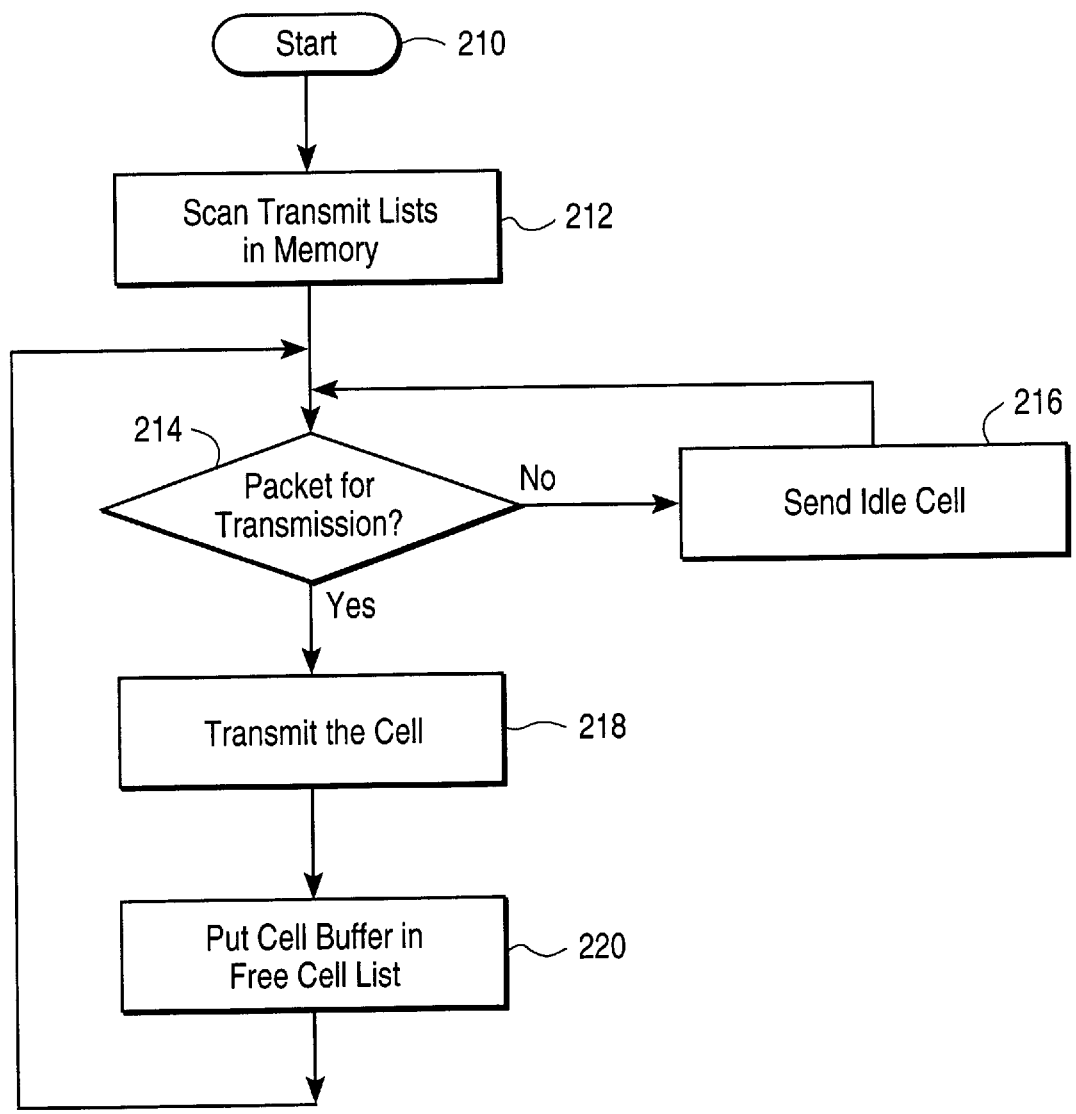
FIG. 8 is a process flowchart for an ATM transmit engine for packet transmission.

FIG. 8 is a process flowchart for an ATM transmit engine for packet transmission. The system starts at step 210. At step 212, the system scans the transmission lists in memory.

At step 214, the system checks for packets which are ready for transmission. If no packets are available, an idle cell is transmitted at step 216. In an ATM environment, something must be sent so an idle (or empty) packet is sent when no packets with data are available for transfer. If a packet is available, the ATM port transmit engine divides it into ATM cells and transmits these cells at step 218. At step 220, the cell buffer for the transmitted cell is put in the free cell buffer list for internal memory management purposes. The system them returns to step 214. An ATM transmit engine is similar to an Ethernet transmit engine (see FIG. 6), except that the Ethernet transmit engine does not need to divide the packet into cells and does not need to send an idle cell.

Figure 9:
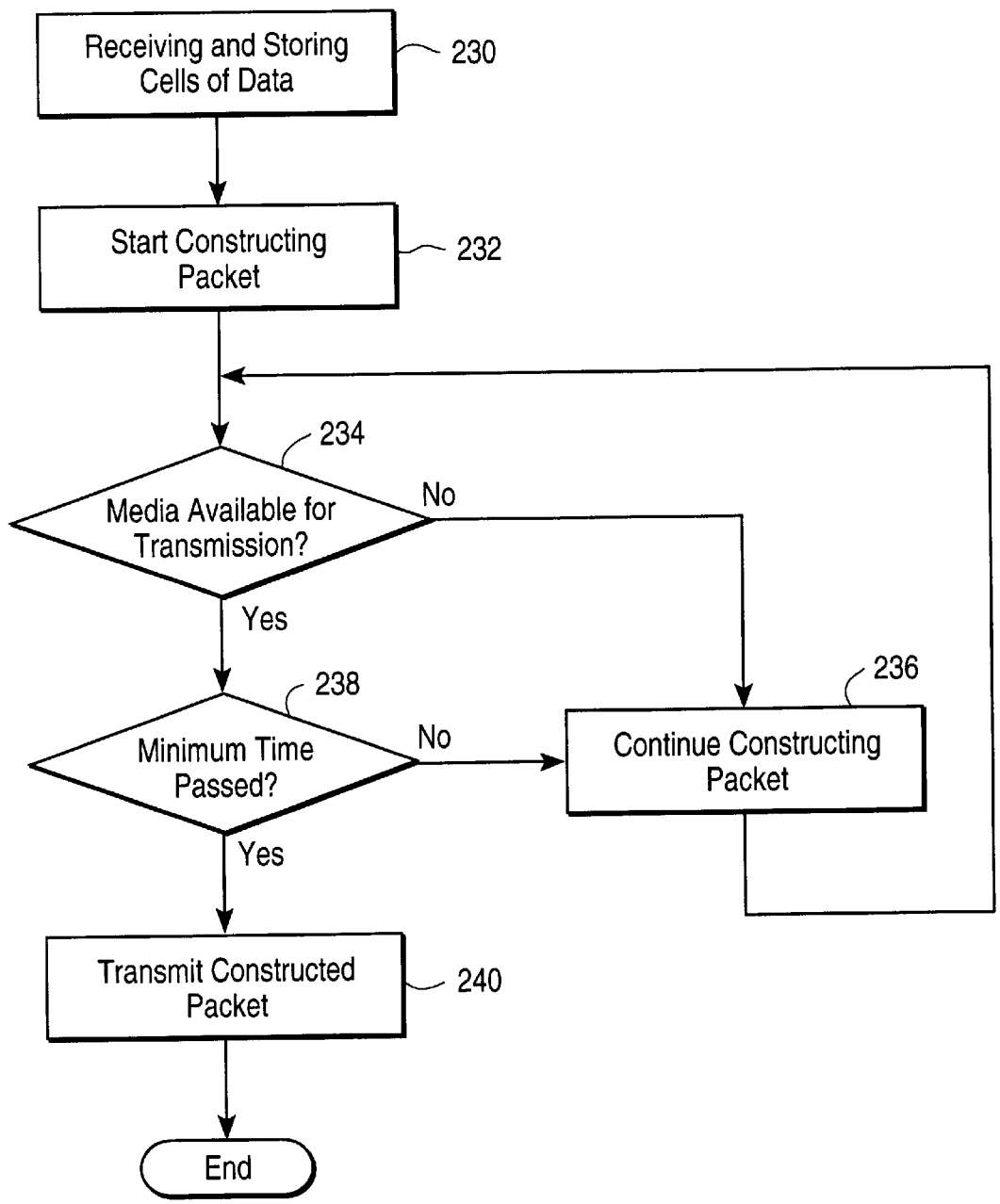
FIG. 9 is a process flowchart for another embodiment of the present invention.

FIG. 9 is a process flowchart for another embodiment of the present invention. At step 230, cells of data are received and stored in memory 40. At step 232, construction of a packet begins. In the preferred embodiment, the system continually checks LAN controller 12 for media availability at step 234. If LAN controller 12 signals that the media is unavailable, the assembly of the packet is continued at step 236. During this assembling, new headers and tails (including checksums) are continually calculated for each of the new data fragments. If construction of the packet is completed before the media becomes available for transmission, additional cells may be added to that packet until the media becomes available. In this situation, the packet is combined with a fractional portion of a second packet. Before this additional combining can occur, the system checks for compatibility of the attributes of both the first packet and the second packet (i.e., same destination address, priority status, etc.). Again, while the building is occurring, new headers and tails are continually calculated. When LAN controller 12 of target port 54 signals that the media is available, whatever has been built is transmitted, including a fractional packet, the first packet, the first packet with a fractional portion of a second packet, the first packet with a second packet, etc.

In the preferred embodiment, when the media is available, the system still waits a predetermined period of time before sending a fractional packet. At step 238, the system checks if the minimum period of time has passed. If the minimum amount of time has not passed, construction of the packet continues at step 236. If the minimum amount of time has passed, the packet is transmitted at step 240. This maintains a minimum size for the fractional packets. After the fractional packet is built and sent to its destination, the remaining bytes of the first packet are built into the next packet(s) which has the same attributes (e.g., same destination, etc.). This process continues until all data in the first packet has been transferred. The fragmentation of various packets into multiple larger and smaller packets reduces latency of the data through the node. This occurs because the available media is used more often/efficiently.

In another embodiment of the present invention, when the network experiences a medium or high load, each packet size is kept above a predetermined minimum size. Under these circumstances, received packets are held and combined until the combined/larger packet size is greater than the predetermined minimum size. The combined/larger packet is then transmitted when the media becomes available. In this alternative embodiment, packets are combined until the minimum size is met, regardless of the availability of the media. Therefore, if the media becomes available, no packets are transferred unless the construction of the larger packet is complete.

We claim:

1. A method for increasing efficiency of data transfer through a network, the data traveling through media of the network in packets and the network having a network protocol with a maximum allowable packet length, comprising the following steps:
    (a) detecting congestion of the packets in the network;
    (b) preserving an original packet;
    (c) constructing a larger packet by combining multiple packets; and
    (d) transmitting at least one of the original packet and the larger packet, the transmitting of the original packet occurring if the media become available for transmission before construction of the larger packet is completed, and the transmitting of the larger packet occurring if the construction of the larger packet is completed before the media become available for transmission;
    wherein the larger packet is smaller than the maximum allowable packet length.

2. The method for increasing efficiency of data transfer through a network of claim 1, wherein the original packet is dequeued from a transmitting module and replaced by the larger packet after the larger packet has been passed along for transmission.

3. The method for increasing efficiency of data transfer through a network of claim 1, wherein the construction of the larger packet is abandoned if the media becomes available for transmission of the original packet and the original packet is successfully transmitted before construction of the larger packet is complete.

4. The method for increasing efficiency of data transfer through a network of claim 1, wherein the preserving and the transmitting of the original packet is done in parallel with the construction of the larger packet.

5. The method for increasing efficiency of data transfer through a network of claim 1, wherein one of the multiple packets is the original packet.

6. The method for increasing efficiency of data transfer through a network of claim 1, wherein the network is at least one of a local area network (LAN), a wide area network (WAN), a metropolitan area network (WAN) and a global area network (GAN).

7. The method for increasing efficiency of data transfer through a network of claim 1, wherein multiple larger packets are constructed before step (d) occurs.

8. The method for increasing efficiency of data transfer through a network of claim 1, wherein multiple larger packets are constructed and transmitted until the congestion of packets is resolved.

9. A network system for increasing efficiency of data transfer through a network, the data traveling through media of the network in packets, comprising:
    a memory for storing multiple original packets;
    construction means for constructing a larger packet by combining at least two of the multiple packets stored in the memory; and
    transmission means for transmitting the larger packet if the media become available for transmission and the larger packet is complete, and for transmitting an original packet if the media become available for transmission before the larger packet is complete.

10. The network system for increasing efficiency of data transfer through a network of claim 9, wherein multiple larger packets are constructed by the construction means, and wherein a largest larger packet is transmitted by the transmission means when the media becomes available for transmission.

11. The network system for increasing efficiency of data transfer through a network of claim 9, wherein the construction means is a compute engine, and wherein the transmission means is a transmit engine.

12. The network system for increasing efficiency of data transfer through a network of claim 9, wherein the larger packet is smaller than a predetermined maximum packet size.

13. A method for increasing efficiency of data transfer through a network, the data traveling through media of the network in packets, and the network having a network protocol, comprising the following steps:

storing multiple original packets;

constructing a larger packet by combining two or more of the multiple packets stored in the memory;

transmitting the larger packet if the media become available for transmission and the larger packet is complete; and transmitting an original packet if the media become available for transmission before the larger packet is complete.

14. The method for increasing efficiency of data transfer through a network of claim 13, wherein multiple larger packets are constructed, and wherein a largest larger packet is transmitted when the media becomes available for transmission.

15. The method for increasing efficiency of data transfer through a network of claim 13, wherein the constructing is done with a compute engine, and wherein the transmitting is done with a transmit engine.

16. The network system for increasing efficiency of data transfer through a network of claim 13, wherein the larger packet is smaller than a predetermined maximum packet size.

17. A network system with a media for data transmission, comprising:

a port for receiving transmitted cells of data;

a memory for storing data from a data stream of cells;

construction means for constructing a packet by combining the cells, the constructing occurring until the media is available for transmission, the size and composition of the constructed packet being independent of an original packet size and composition; and a controller for transmitting the constructed packets when the media becomes available for transmission.

18. The network system of claim 17, wherein the construction of the packet is done for at least a minimum predetermined amount of time.

19. The network system of claim 17, wherein the constructed packet is a portion of the original packet.

20. The network system of claim 17, wherein the constructed packet is larger than the original packet.

21. The network system of claim 17, wherein each of the constructed packets includes a header, user data and a tail.

22. A method for increasing efficiency of data transfer through a network, the data traveling through media of the network in packets, comprising:

receiving transmitted cells of data;

storing data from a data stream of cells;

constructing a packet by combining cells, the constructing occurring until the media are available for transmission, the size and composition of the constructed packet being independent of an original packet size and composition; and transmitting the constructed packet when the media become available for transmission.

23. The method for increasing efficiency of data transfer through a network of claim 22, wherein the constructing of the packet is done for a minimum predetermined amount of time.

24. The method for increasing efficiency of data transfer through a network of claim 22, wherein the constructed packet is a portion of the original packet.

25. The method for increasing efficiency of data transfer through a network of claim 22, wherein the constructed packet is larger than the original packet.

* * * * *